(12) United States Patent
Li

(10) Patent No.: US 8,836,920 B2
(45) Date of Patent: Sep. 16, 2014

(54) STRUCTURE OF AN OPTICAL PATH FOR LASER RANGE FINDING

(71) Applicant: Nen-Tsua Li, Taichung (TW)

(72) Inventor: Nen-Tsua Li, Taichung (TW)

( * ) Notice: Subject to any disclaimer, the term of this patent is extended or adjusted under 35 U.S.C. 154(b) by 40 days.

(21) Appl. No.: 13/759,042

(22) Filed: Feb. 5, 2013

(65) Prior Publication Data

US 2014/0218715 A1    Aug. 7, 2014

(51) Int. Cl.
  *G01C 3/08*    (2006.01)

(52) U.S. Cl.
  CPC ........................................ *G01C 3/08* (2013.01)
  USPC ............ 356/4.01; 356/4.1; 356/5.01; 356/5.1

(58) Field of Classification Search
  USPC ............. 356/3.01–3.15, 4.01–4.1, 5.01–5.15, 356/6–22, 28, 28.5
  See application file for complete search history.

(56) References Cited

U.S. PATENT DOCUMENTS

| | | | |
|---|---|---|---|
| 6,781,675 B2 * | 8/2004 | Gogolla et al. | 356/4.01 |
| 7,738,083 B2 * | 6/2010 | Luo et al. | 356/5.15 |
| 8,432,535 B2 * | 4/2013 | Yang | 356/5.05 |

* cited by examiner

*Primary Examiner* — Luke Ratcliffe

(57) ABSTRACT

A structure of an optical path for laser range finding includes a main body and a light-emitting unit assembled in the main body. The main body has a transmitting channel, a receiving channel and a calibration channel. The light-emitting unit is assembled in the transmitting channel. The light-emitting unit emits an external optical beam and an internal optical beam. The external optical beam is emitted through the transmitting channel. The internal optical beam is emitted to the receiving channel via the calibration channel. An included angle is defined between the external optical beam and the internal optical beam. A receiver is mounted in the receiving channel. Under this arrangement, the external optical beam and the internal optical beam do not interfere with each other.

8 Claims, 11 Drawing Sheets

STRUCTURE OF AN OPTICAL PATH FOR LASER RANGE FINDING

BACKGROUND OF THE INVENTION

1. Field of the Invention

The present invention relates to a structure of an optical path, and more particularly to a structure of an optical path for laser range finding.

2. Description of Related Art

A laser rangefinder is a device which uses a laser beam to determine the distance to an object. The basic principle of said laser rangefinder is measuring the phase difference between the transmitted laser and the received APD (avalanche photo diode) is used as conventional laser receiver so that the distance can be calculated.

A conventional device for distance measurement has a mechanical switcher used to obtain an internal reference distance. As a result of mechanical switching of a transmit laser beam, a reference beam and a measuring beam are reached to a receiver alternately, so that the measuring beam and the reference beam are detected in succession manner. During the measuring process, the condition of electric components is changed. All components and connection line contribute to the signal delays in the system. The greatest delay generates shortly after the system is switched on due to the self-heating of the components. Because of the succession measuring is so fast, the drift can be eliminated. However, during the repeatedly mechanical switching, the measurement process results in high mechanical stresses and the moving part is worn easily so as to lead an inaccurate measurement result. Furthermore, complicated designs also increase the manufacturing cost, the device weight and volume.

Another conventional laser distance measurement device, a reference APD is used to obtain an internal calibration reference distance, and a laser beam is divided by a beam splitter before transmitting to a target. Only small part of the laser beam is reached to the reference APD, so that a calibration signal and a measurement signal are generated simultaneously. Therefore, the drift can be cancelled. However, the APD component is a high cost device in the laser distance system, which will increase the total cost.

Furthermore, any change of element or transmit line cause the delay, so does the variation measurement value. In addition, laser diodes and APD are temperature dependent photoelectrical component which are easily influenced by the self-heating or environmental temperature variation. In order to improve the measurement accuracy, the calibration manner or structure should be adopted.

Even more, when the operating temperature of the AVD is varied, the APD cannot work normally so as to lead an inaccurate measurement result finally.

The present invention has arisen to mitigate and/or obviate the disadvantages of the conventional laser rangefinder.

SUMMARY OF THE INVENTION

The main objective of the present invention is to provide an improved structure of an optical path for laser range finding.

To achieve the objective, a structure of an optical path for laser range finding comprises a main body and a light-emitting unit assembled in the main body, the main body having a transmitting channel, a receiving channel and a calibration channel defined therein, the calibration channel communicating with the transmitting channel and the receiving channel, the light-emitting unit assembled in the transmitting channel, the light-emitting unit emitting two light beams, one light beam being an external optical beam and another light beam being an internal optical beam, the external optical beam emitted through the transmitting channel, the internal optical beam emitted to the receiving channel via the calibration channel, an included angle being defined between the external optical beam and the internal optical beam, and a receiver mounted in the receiving channel. Wherein the light-emitting unit further has a conductive substrate and a laser chip; the laser chip is electrically connected to the conductive substrate; the external optical beam and the internal optical beam are emitted from the laser chip; the light-emitting unit has a plurality of laser chips defined therein; each laser chip is electrically connected to the conductive substrate; the external optical beam and the internal optical beam are emitted from each corresponding laser chip; the main body has a control device disposed thereon; the control device is electrically connected with the light-emitting unit so as to turn on or turn off the laser chips of the light-emitting unit selectively; the included angle between the internal optical beam and the external optical beam is optionally defined between 2-180 degrees; the calibration channel has a reflecting portion defined therein; the internal optical beam is emitted to the reflecting portion and reflected toward the receiver in the receiving channel; the reflecting portion of the calibration channel has a reflecting sheet disposed thereon wherein the reflecting sheet is a reflecting prism or a total reflection sheet; the main body has an optical fiber mounted therein; the optical fiber is disposed from the transmitting channel to the receiving channel via the calibration channel and communicates with the receiver; the receiving channel has a filter disposed therein which is applied for reflecting or filtering the internal optical beam; the internal optical beam is reflected or filtered via the filter and passes into the receiver for measurement.

Under this arrangement, the external optical beam and the internal optical beam do not interfere with each other because of the included angle.

Further benefits and advantages of the present invention will become apparent in the detailed description with appropriate reference to the accompanying drawings.

DETAILED DESCRIPTION OF THE INVENTION

Figure 1:
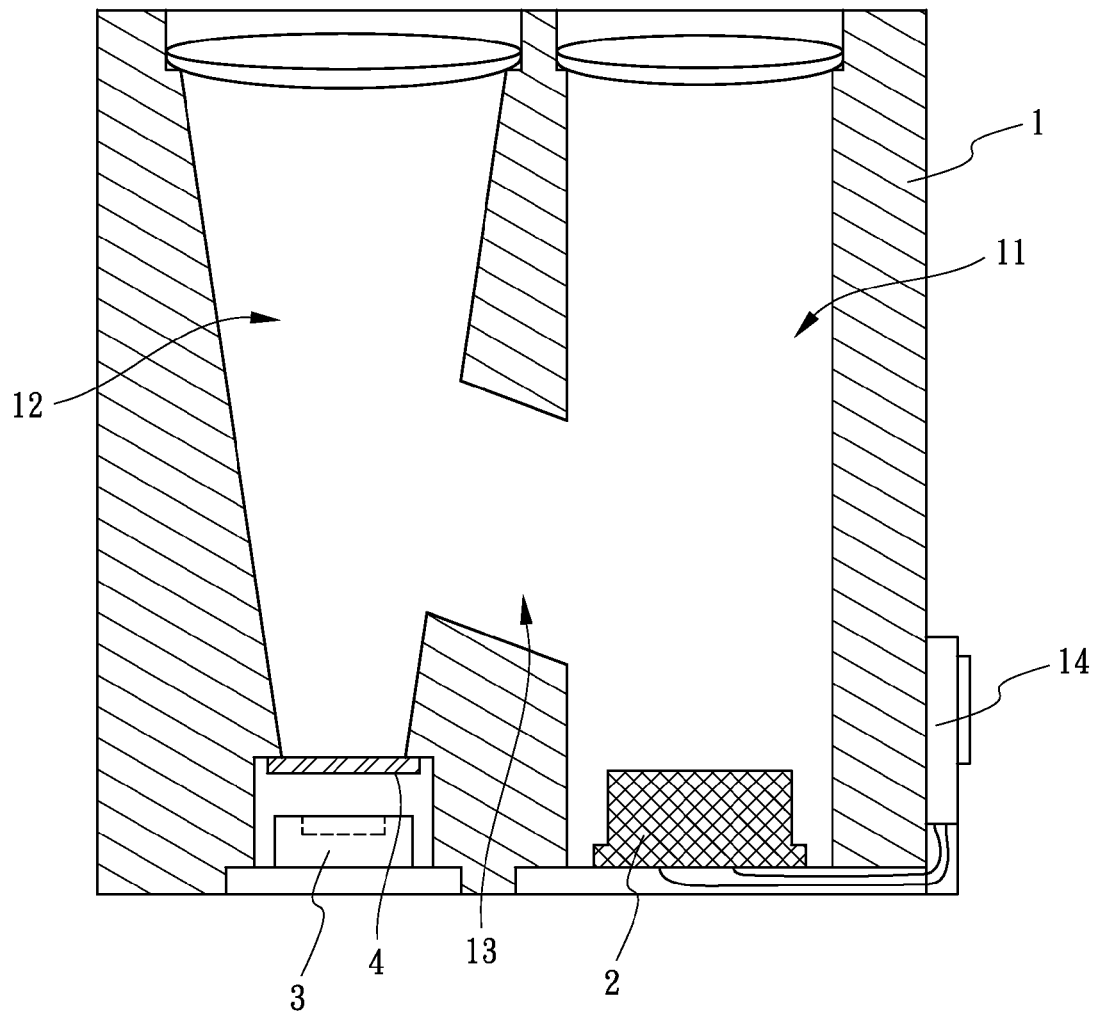
FIG. 1 is a schematic view of a structure of an optical path for laser range finding of a first embodiment of the present invention.
Figure 2:
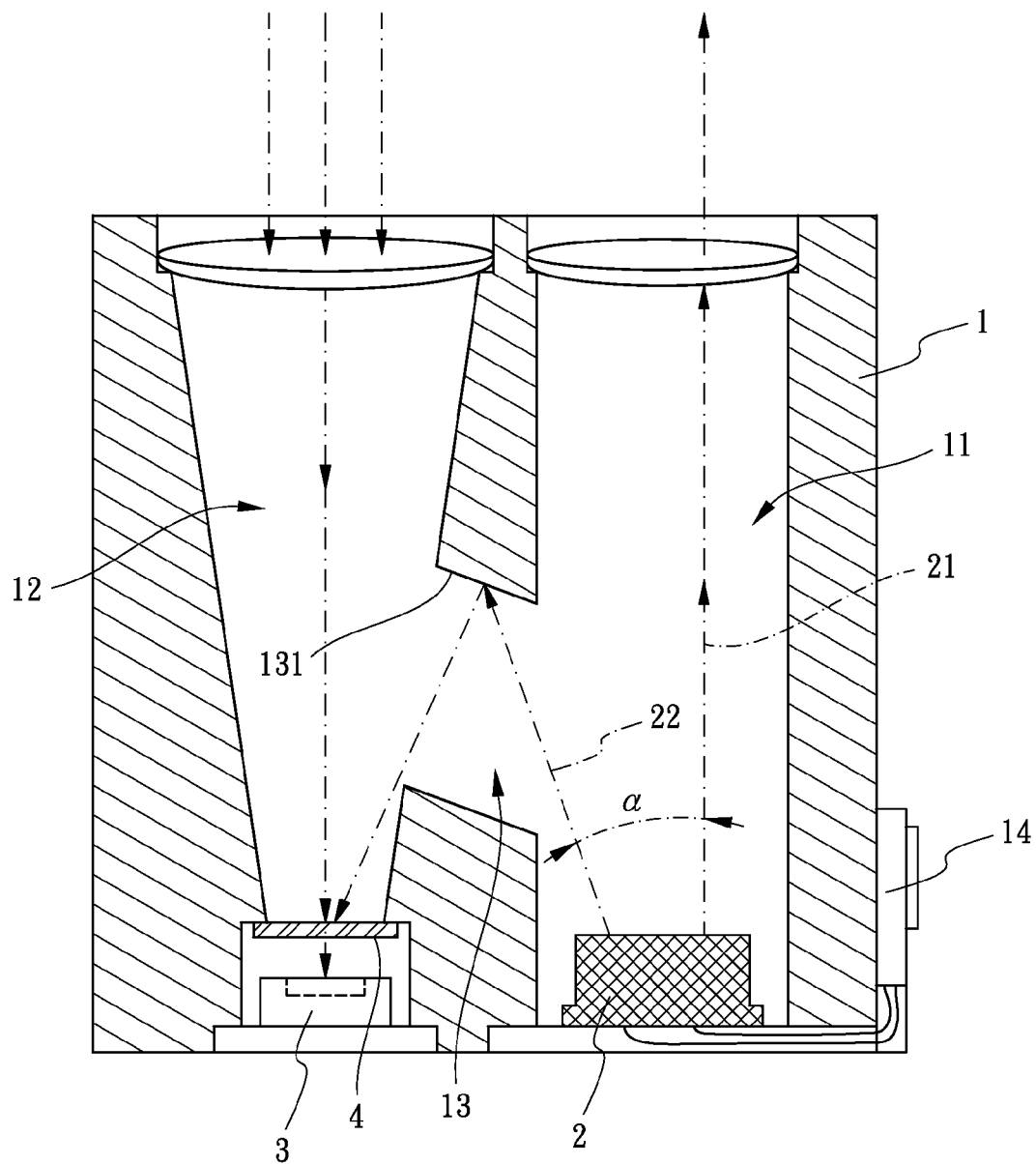
FIG. 2 is a schematic view for showing an external optical beam and an internal optical beam of the present invention.

FIGS. 1-2 show a first embodiment of a structure of an optical path for laser range finding in accordance with the present invention. The structure of an optical path for laser range finding comprises a main body 1 and a light-emitting unit 2 which is assembled in the main body 1.

The main body 1 has a transmitting channel 11, a receiving channel 12 and a calibration channel 13 defined therein. The calibration channel 13 communicates with the transmitting channel 11 and the receiving channel 12. The calibration channel 13 has a reflecting portion 131 defined at one end thereof. The reflecting portion 131 corresponds to the receiving channel 12. The transmitting channel 11 and the receiving channel 12 are opened through the main body 1 and are parallel with each other.

The light-emitting unit 2 is assembled in the transmitting channel 11. The light-emitting unit 2 emits two light beams, one light beam is an external optical beam 21 and another light beam is an internal optical beam 22. The external optical beam 21 is emitted through the transmitting channel 11 to an object and reflected by the object, so that the external optical beam 21 passes through the receiving channel 12 eventually. The internal optical beam 22 is emitted to the reflecting portion 131 and reflected toward the receiving channel 12 by the reflecting portion 131. An included angle a is defined between the external optical beam 21 and the internal optical beam 22, so that the external optical beam 21 and the internal optical beam 22 do not interfere with each other. A receiver 3 is mounted in the receiving channel 12 for receiving the light beams in the receiving channel 12.

Under this arrangement, the user operates the present invention for measuring a distance between the present invention and the object. In addition, the structure of an optical path for laser range finding of the present invention improves the measurement error caused by the interaction of the optical beams 21, 22.

The detail descriptions of the light-emitting unit 2 are described as following.

Figure 3:
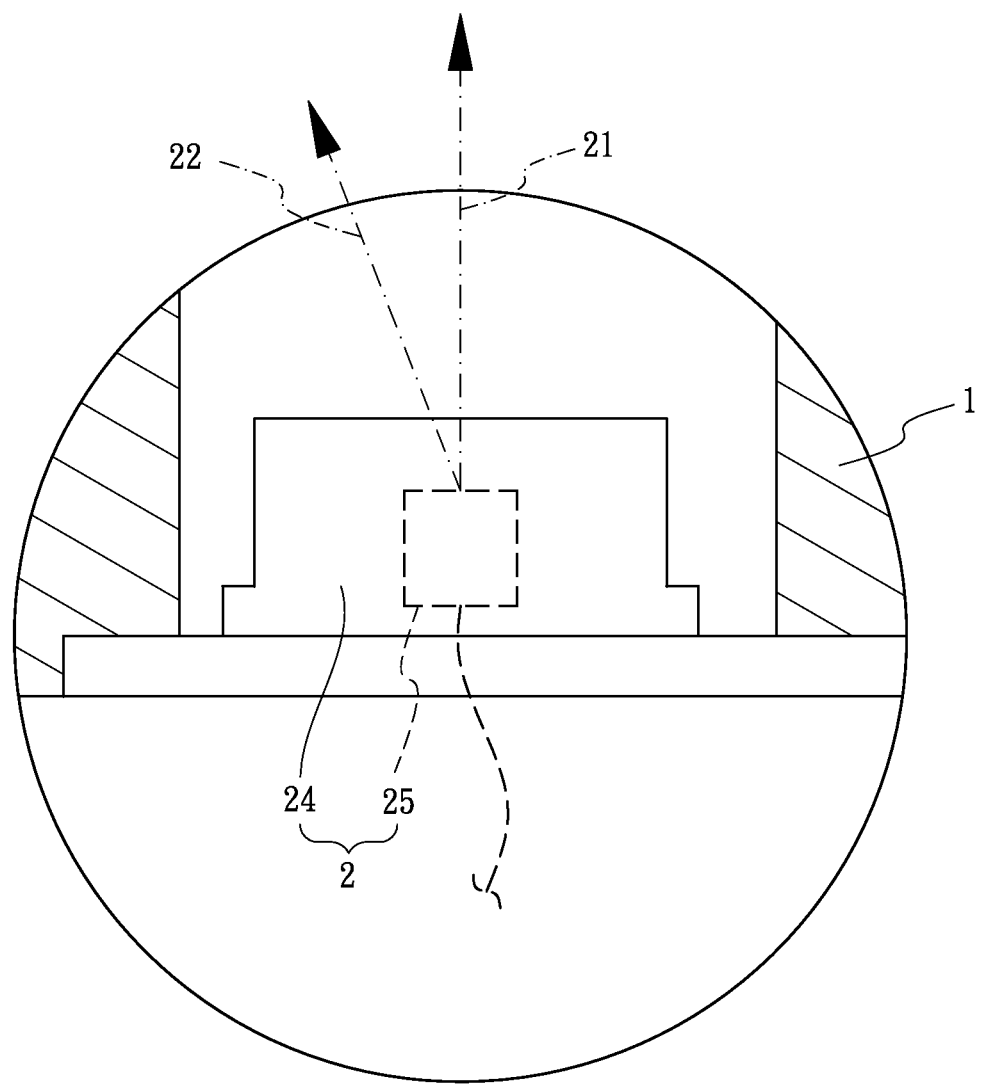
FIG. 3 is a partial enlarged view for showing a light-emitting unit of the present invention.

Referring to FIG. 3, the light-emitting unit 2 further has a conductive substrate 24 and a laser chip 25. The laser chip 25 is electrically connected to the conductive substrate 24. The external optical beam 21 and the internal optical beam 22 are emitted from the laser chip 25.

Figure 4:
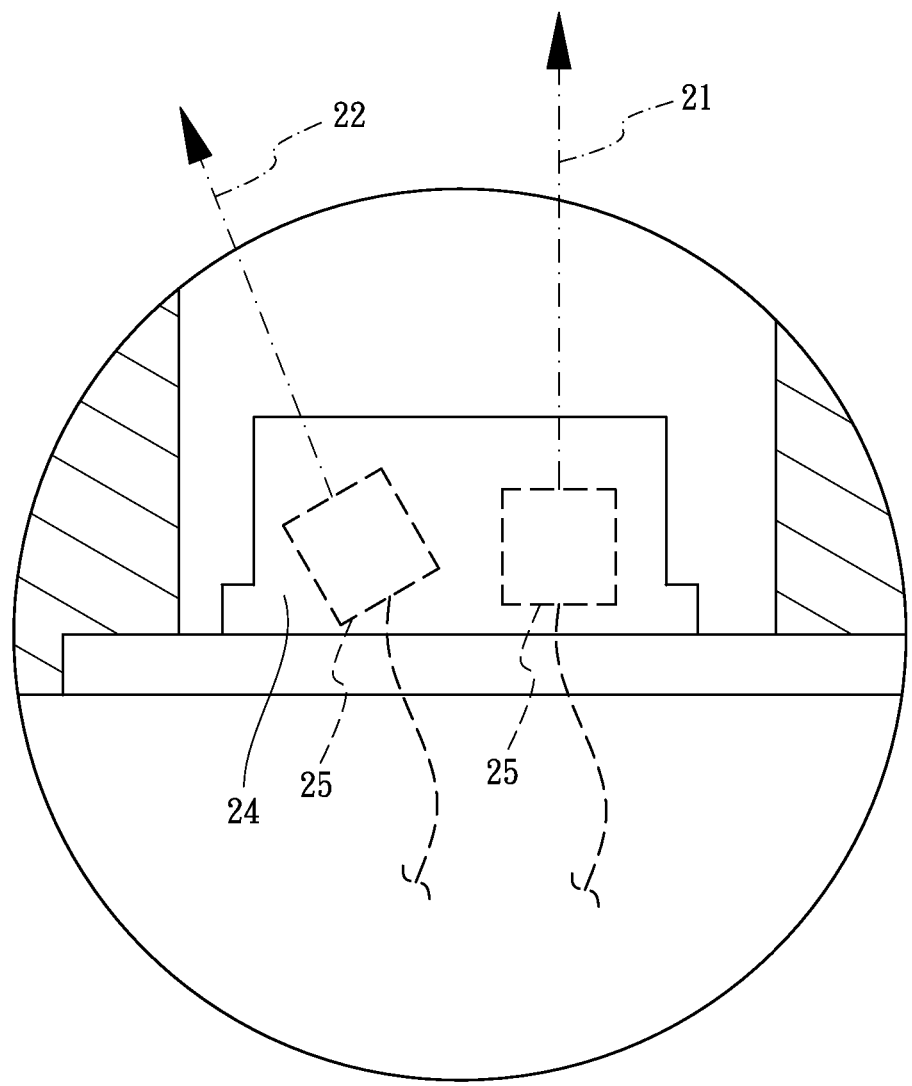
FIG. 4 is a partial enlarged view for showing another light-emitting unit of the present invention.

Referring to FIG. 4, the light-emitting unit 2 has a plurality of laser chips 25 defined therein. Each laser chip 25 is electrically connected to the conductive substrate 24. In a preferred embodiment, the light-emitting unit 2 has two laser chips 25 defined therein, and the external optical beam 21 and the internal optical beam 22 are emitted from each corresponding laser chip 25 respectively. In other words, the conductive substrate 24 is selectively connected with a single laser chip 25 or a plurality of laser chips 25. The advantages of the two assembly means mentioned above are described as following. When a single laser chip 25 is assembled on the conductive substrate 24, the operating temperature of the light-emitting unit 2 is stabilized; furthermore, when a plurality of laser chips 25 is assembled on the conductive substrate 24, the operating temperature of the laser chips is uniform because the laser chips are assembled in the same light-emitting unit 2. Thereby, the cost of the light-emitting unit is reduced.

Referring to FIGS. 1-4, the main body 1 has a control device 14 disposed thereon. The control device 14 is electrically connected with the light-emitting unit 2 so as to turn on or turn off the laser chip 25 of the light-emitting unit 2 selectively. Therefore, a user controls a lighting mode of the light-emitting unit 2 according to the requirement.

Referring to FIG. 2, in order to confirm that the external optical beam 21 passes through the transmitting channel 11 while the internal optical beam 22 passes through the calibration channel 13 and is reflected to the receiving channel 12 for a correction purpose, the included angle a between the internal optical beam 22 and the external optical beam 21 is optionally defined between 2-180 degrees so as to prevent the external optical beam 21 and the internal optical beam 22 from being interfered with each other.

The reflecting portion 131 of the calibration channel 13 is important because the reflecting portion 131 of the calibration channel 13 ensures that the internal optical beam 22 from the laser chip 25 is reflected to the receiving channel 12 in the main body 1. Other embodiments of the reflecting portion 131 of the present invention are described as following.

1. Referring to FIGS. 1-9, the receiving channel 12 has a filter 4 disposed therein which is applied for reflecting or filtering the internal optical beam 22. The internal optical beam 22 is reflected or filtered via the filter 4 and passes into the receiver 3 for measurement.

2. Referring to FIG. 2, the reflecting portion 131 of the calibration channel 13 is a smooth surface.

Figure 5:
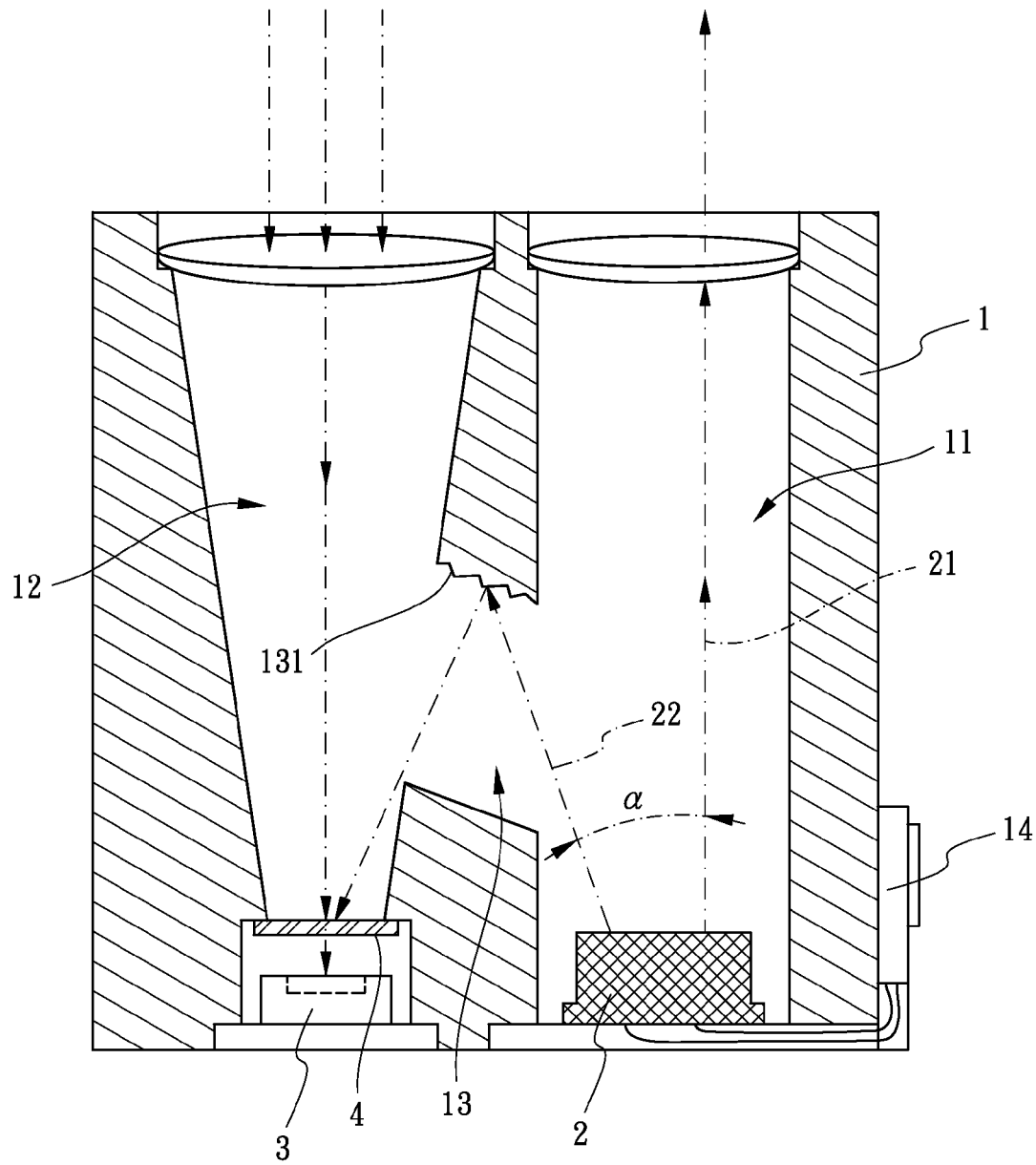
FIG. 5 is a schematic view of a second embodiment of the present invention for showing a reflecting portion is a rough surface.

3. Referring to FIG. 5, the reflecting portion 131 of the calibration channel 13 is a rough surface. (The reflecting portion 131 of the calibration channel 13 is coated with a light reflective material so as to increase the performance of the reflection.)

Figure 6:
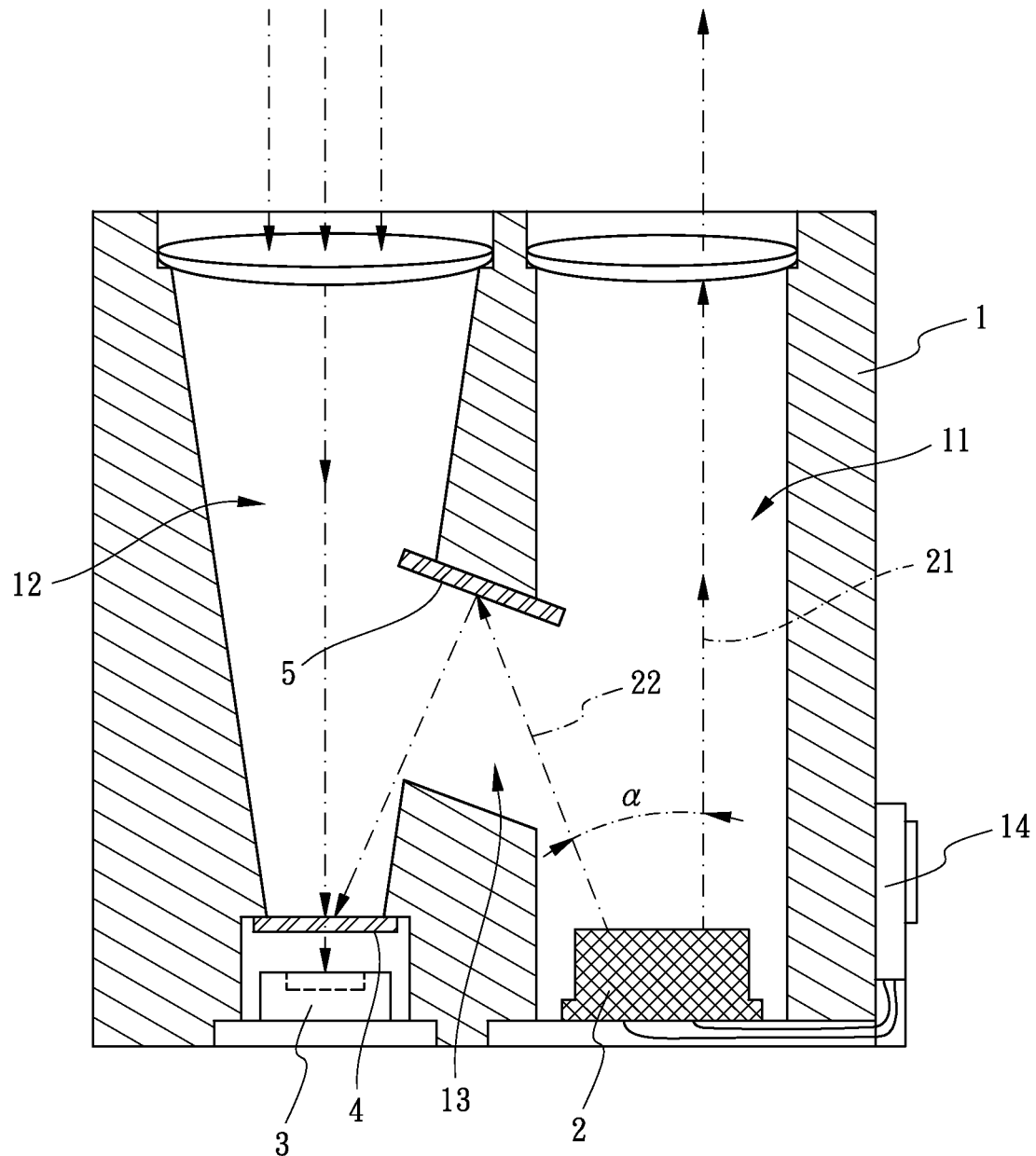
FIG. 6 is a schematic view of a third embodiment of the present invention for showing a reflecting sheet is assembled on the reflecting portion.

4. Referring to FIG. 6, the reflecting portion 131 of the calibration channel 13 has a reflecting sheet 5 disposed thereon. The internal optical beam 22 passes through the calibration channel 13 to the reflecting sheet 5 and is reflected by the reflecting sheet 5, so that the internal optical beam 22 is reflected to the filter 4 and passes into the receiver 3 for measurement. Wherein, the reflecting sheet 5 is a reflecting prism or a total reflection sheet.

Figure 7:
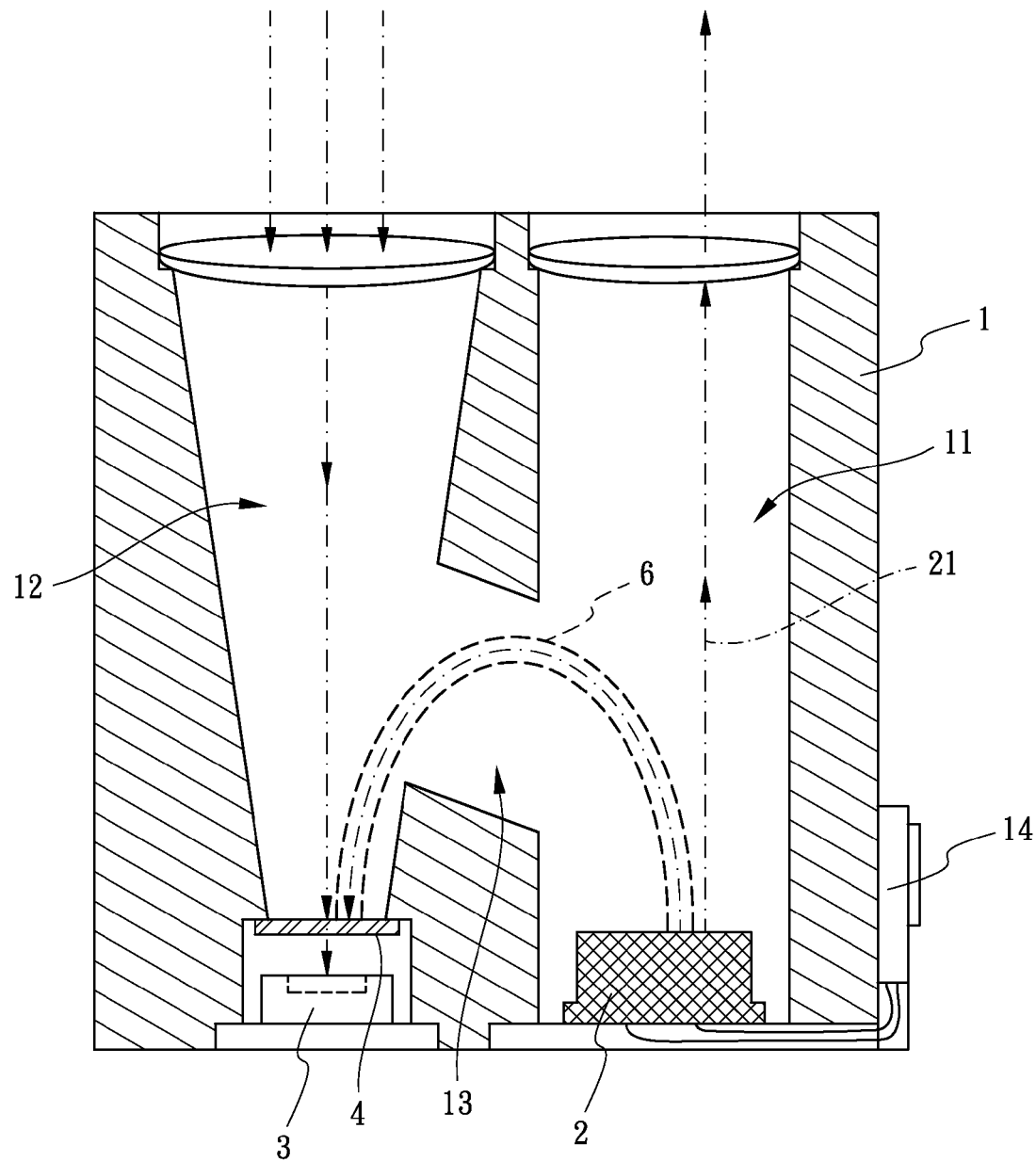
FIG. 7 is a schematic view of a fourth embodiment of the present invention for showing an optical fiber is disposed in a calibration channel.

5. Referring to FIG. 7, the main body 1 has an optical fiber 6 mounted therein. One end of the optical fiber connects with the light-emitting unit 2, and another end of the optical fiber connects with the filter 4. The optical fiber passes through the calibration channel 13 Therefore, the internal optical beam 22 is transmitted from one end of the optical fiber 6 to the filter 4 and passes into the receiver 3 for measurement.

Figure 10:
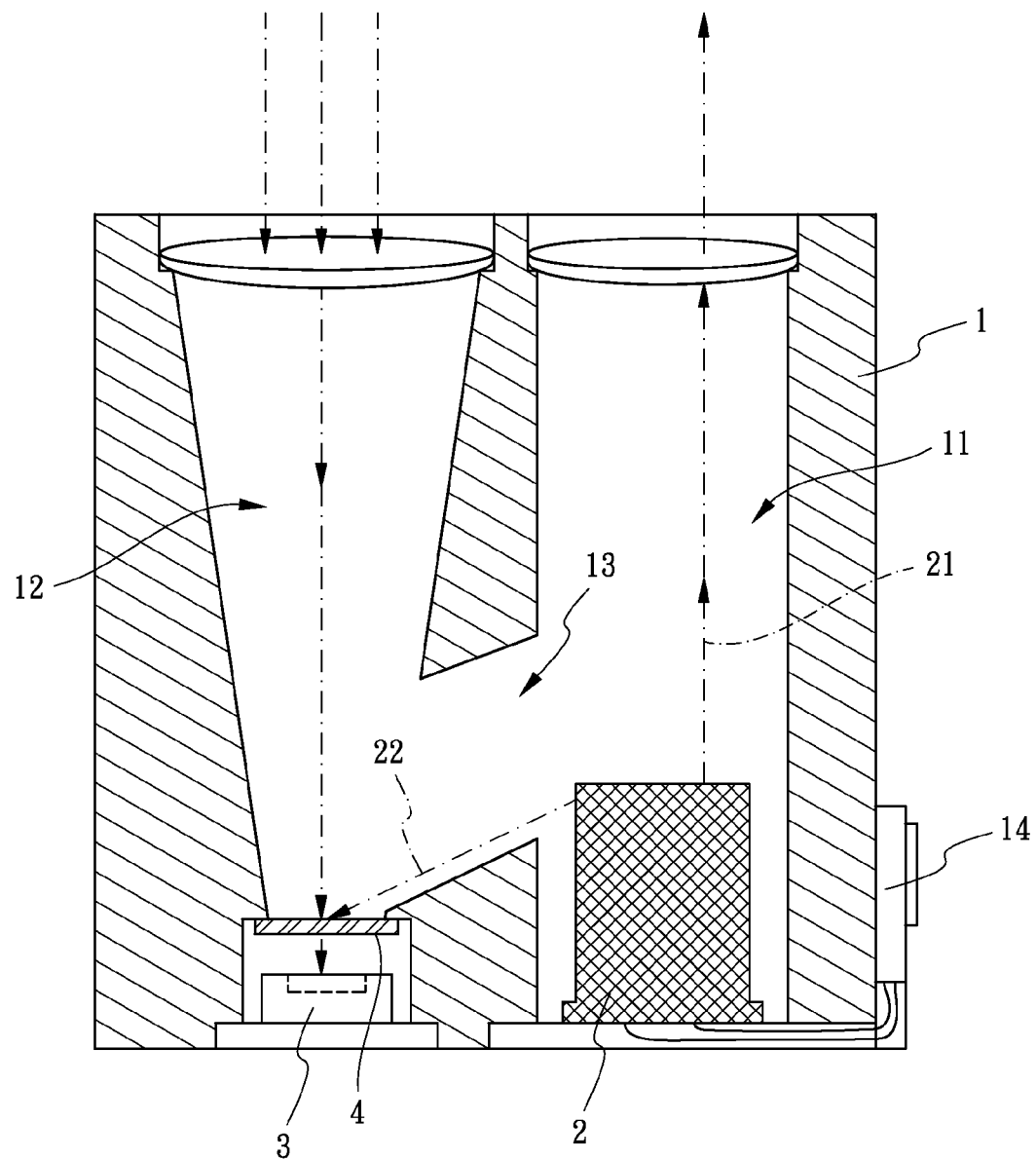
FIG. 10 is a schematic view of a seventh embodiment of the present invention for showing the height of the light-emitting unit is higher than the height of the calibration channel.

6. Referring to FIG. 10, the height of the calibration channel 13 and the height of the light-emitting unit 2 are adjustable. When the height of the light-emitting unit 2 is higher than the height of the calibration channel 13, the internal optical beam 22 of the light-emitting unit 2 passes through the calibration channel 13 directly so as to pass into the receiver 3.

Figure 11:
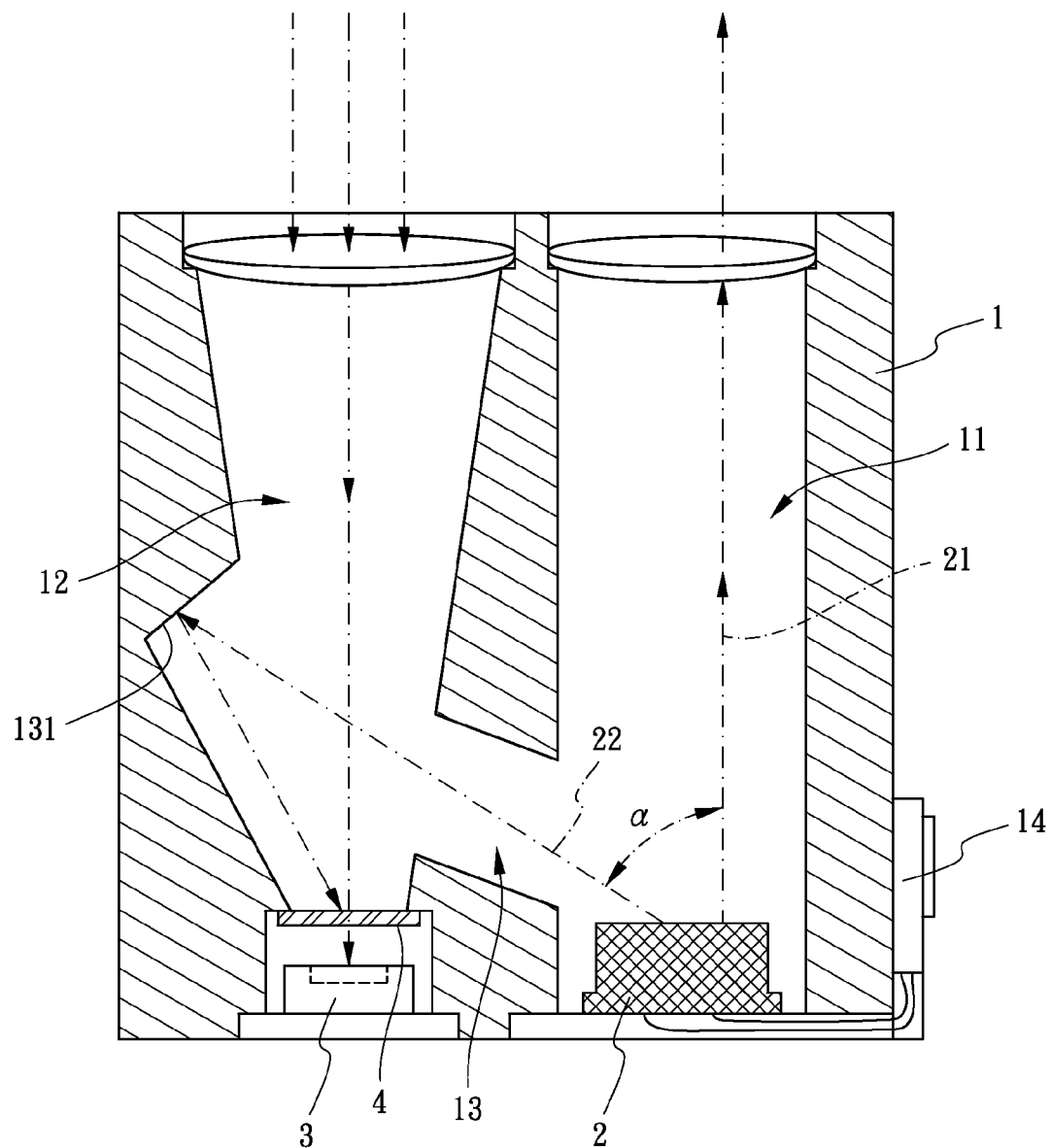
FIG. 11 is a schematic view of an eighth embodiment of the present invention for showing a reflecting portion is disposed on an inner wall of the receiving channel.

7. Referring to FIG. 11, the reflecting portion 131 is disposed on an inner wall of the receiving channel 12 and corresponds to the internal optical beam 22. The internal optical beam 22 passes through the calibration channel 13 to the reflecting portion 131 of the receiving channel 12 and is reflected by the reflecting portion 131, so that the internal optical beam 22 is reflected to the filter 4 and passes into the receiver 3 for measurement.

Figure 8:
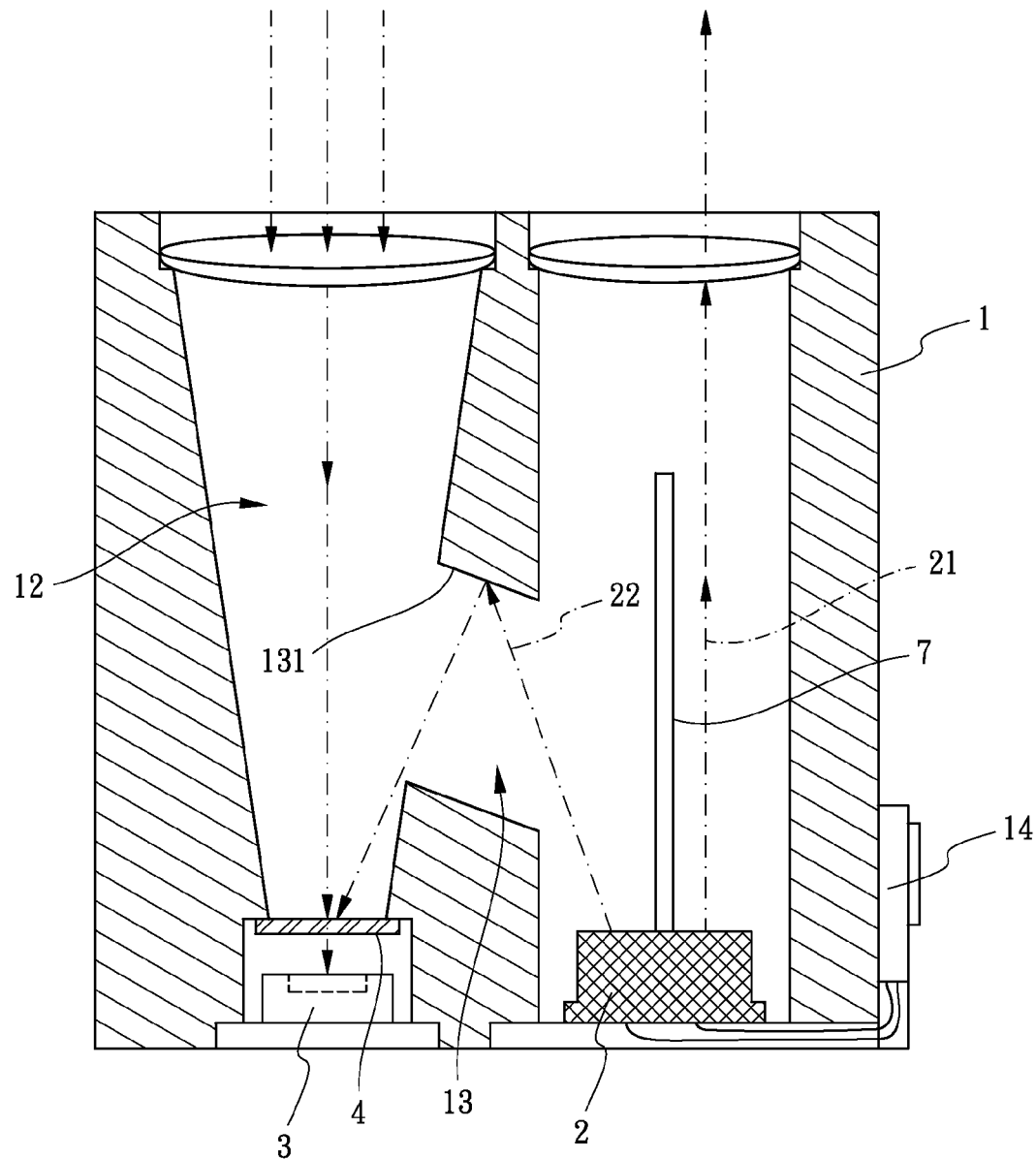
FIG. 8 is a schematic view of a fifth embodiment of the present invention for showing a baffle plate is disposed on the light-emitting unit.
Figure 9:
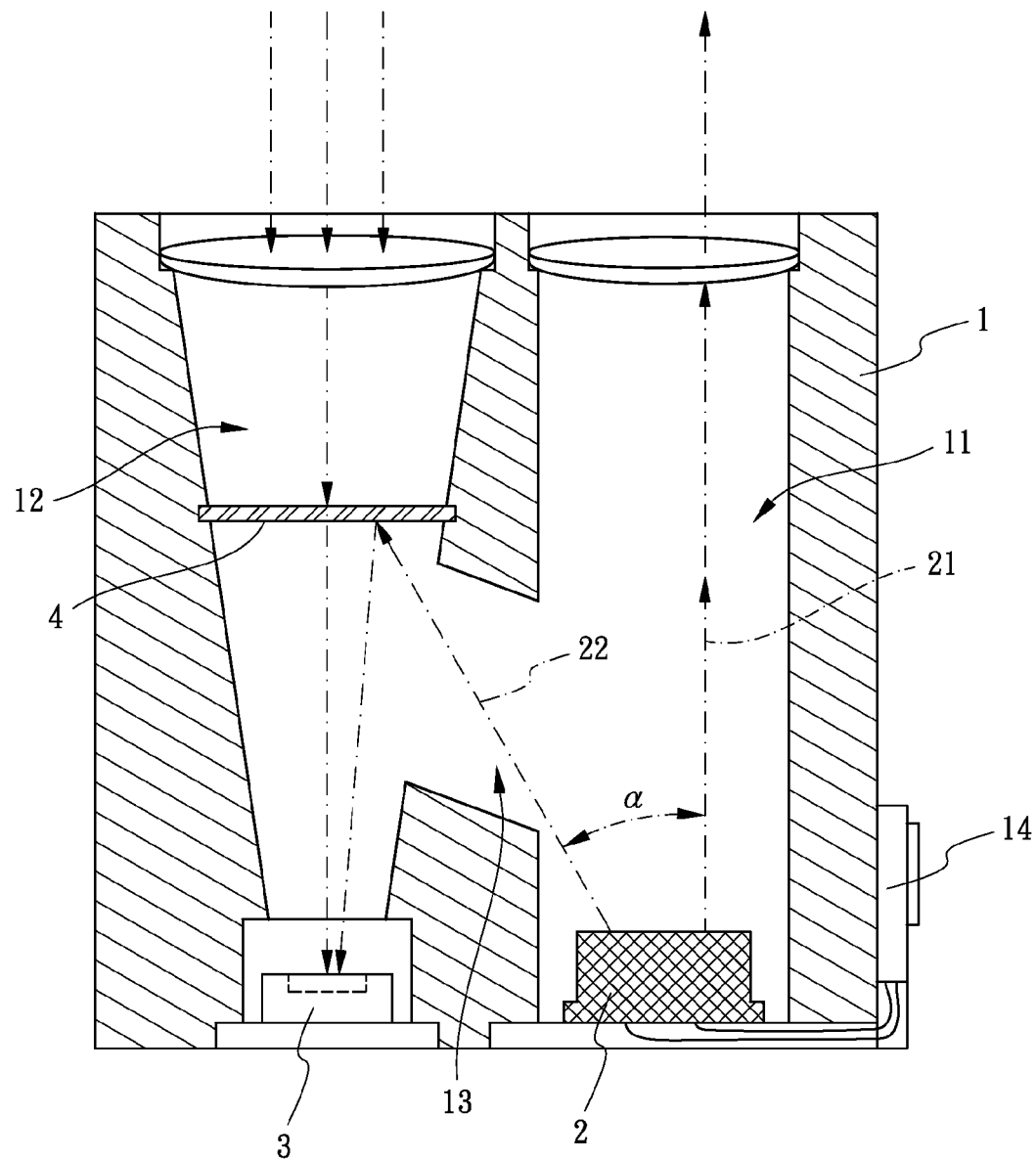
FIG. 9 is a schematic view of a sixth embodiment of the present invention for showing a filter is positioned above the calibration channel.

Referring to FIG. 8, the light-emitting unit 2 of the present invention further has a baffle plate 7 disposed thereon. The baffle plate 7 is applied to separate the internal optical beam 22 and the external optical beam 21 so as to prevent the internal optical beam 22 and the external optical beam 21 from being interfered with each other.

Although the invention has been explained in relation to its preferred embodiment, it is to be understood that many other possible modifications and variations can be made without departing from the spirit and scope of the invention as hereinafter claimed.

What is claimed is:

1. A structure of an optical path for laser range finding comprising:
   a main body and a light-emitting unit assembled in the main body;
   the main body having a transmitting channel, a receiving channel and a calibration channel defined therein, the calibration channel communicating with the transmitting channel and the receiving channel;
   the light-emitting unit assembled in the transmitting channel, the light-emitting unit including a conductive substrate and two laser chips both mounted on the conductive substrate; one of the laser chips provided for emitting an external optical beam, and the other laser chip provided for emitting an internal optical beam, the external optical beam emitted through the transmitting channel, the internal optical beam emitted to the receiving channel via the calibration channel, an included angle being defined between the external optical beam and the internal optical beam; and
   a receiver mounted in the receiving channel to receive the external optical beam reflected by a measurement object and the internal optical beam;
   wherein the external optical beam and the internal optical beam do not interfere with each other because of the included angle.

2. The structure of an optical path for laser range finding as claimed in claim 1, wherein the main body has a control device disposed thereon; the control device is electrically connected with the light-emitting unit so as to turn on or turn off the laser chips of the light-emitting unit selectively.

3. The structure of an optical path for laser range finding as claimed in claim 1, wherein the included angle between the internal optical beam and the external optical beam is more than 90 degrees and less than 180 degrees to have the internal optical beam emitted in a direction to the receiver without being reflected.

4. The structure of an optical path for laser range finding as claimed in claim 1, wherein the calibration channel has a reflecting portion defined therein; the internal optical beam is emitted to the reflecting portion and reflected toward the receiver in the receiving channel.

5. The structure of an optical path for laser range finding as claimed in claim 4, wherein the reflecting portion of the calibration channel has a reflecting sheet disposed thereon; wherein the reflecting sheet is a reflecting prism or a total reflection sheet.

6. The structure of an optical path for laser range finding as claimed in claim 1, wherein the main body has an optical fiber mounted therein; the optical fiber is disposed from the transmitting channel to the receiving channel via the calibration channel and communicates with the receiver.

7. The structure of an optical path for laser range finding as claimed in claim 1, wherein the receiving channel has a dichroic filter disposed therein before the receiver, which is applied for transmitting the reflected external optical beam from the measurement object to the receiver and reflecting the internal optical beam into the receiver for measurement.

8. The structure of an optical path for laser range finding as claimed in claim 1, wherein the receiving channel has a recessed wall to define a reflecting surface substantially facing the light emitting unit such that the internal optical beam is emitted through the calibration channel and reflected by the reflecting surface of the receiving channel in a direction toward the receiver in the receiving channel.

* * * * *